United States Patent [19]

Carroll, Jr. et al.

[11] Patent Number: 4,921,755
[45] Date of Patent: May 1, 1990

[54] COATING COMPOSITION AND COATED ARTICLE

[75] Inventors: John F. Carroll, Jr.; David A. Feindel, both of Rochester, N.Y.

[73] Assignee: Eastman Kodak Company, Rochester, N.Y.

[21] Appl. No.: 171,975

[22] Filed: Mar. 23, 1988

[51] Int. Cl.⁵ .............................................. B32B 5/16
[52] U.S. Cl. .................................. 428/328; 524/439; 524/440; 524/441
[58] Field of Search ................ 428/328; 524/439, 440, 524/441

[56] References Cited

U.S. PATENT DOCUMENTS

| 3,941,584 | 3/1976 | Tundermann et al. | 75/0.5 R |
|---|---|---|---|
| 4,093,571 | 6/1978 | Gordon et al. | 260/2.5 B |
| 4,318,747 | 3/1982 | Ishimjima et al. | 106/290 |
| 4,359,504 | 11/1982 | Troy | 428/403 |

FOREIGN PATENT DOCUMENTS

| 0230364 | 7/1987 | European Pat. Off. . |
| 0251546 | 1/1988 | European Pat. Off. . |
| 0261815 | 3/1988 | European Pat. Off. . |

Primary Examiner—Marion C. McCamish
Assistant Examiner—Elizabeth M. Cole
Attorney, Agent, or Firm—William J. Davis

[57] ABSTRACT

Paint compositions which contain stretchable polymers and reflective metal flakes are used to form stretchable films for the thermoforming of protective and decorative films on various articles, including automobile panels. The use of low melting metallic flakes improves the retention of gloss when the films are stretched during thermoforming.

14 Claims, 2 Drawing Sheets

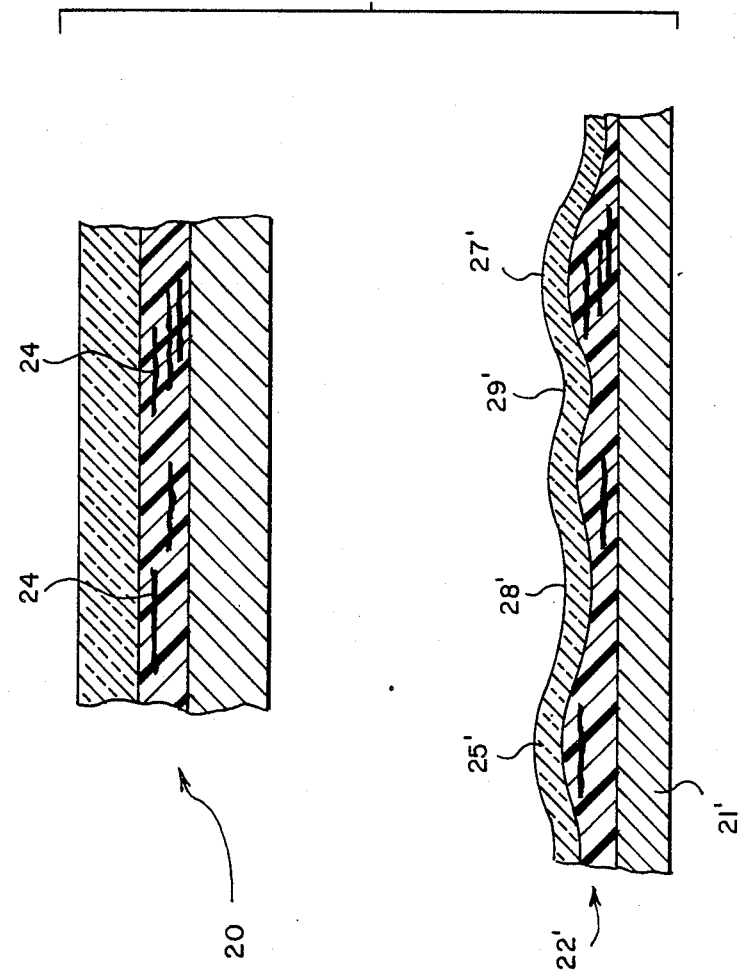

4,921,755

COATING COMPOSITION AND COATED ARTICLE

FIELD OF THE INVENTION

This invention relates to paint compositions, and more particularly, to such compositions containing metallic flakes and to articles coated with such compositions.

BACKGROUND

Reafler, U.S. patent application Ser. No. 116,426, describes a flexible and stretchable sheet material that is capable of being stretched to conform to a three dimensional substrate to form a protective and decorative coating thereon. The sheet material is comprised of a thin flexible support having adhered thereto a protective and decorative layer such as a paint layer comprising a colorant incorporated in a film-forming binder. The sheet material can also comprise an adhesion-promoting tie-layer between the support sheet and the protective and decorative layer, and a clear topcoat. An adhesive backcoat can also be provided on the side of the support opposite the protective and decorative layer.

In addition to a colorant and a binder the paint layer can contain reflective particles, of which aluminum flakes are a leading example. The reflective flakes provide an aesthetically pleasing effect because of both sparkle and geometric metamerism or "flop". Flop results because of the flake reflections that are lighter than white pigment close to the specular reflection angle and which fall off rapidly away from the specular reflection angle to very much darker than white pigment. Particularly when the flakes are oriented substantially parallel to the film surface, the high degree of flop provides lightness variations which emphasize the lines and contours of the decorated three-dimensional substrate.

The sheet material of the Reafler application is applied to a three-dimensional substrate by thermoforming, usually with vacuum and/or air pressure. The sheet is softened by heating to a substantially plastic state, and plastically stretched to an extended state depending on the shape of the substrate.

The sheet material is thus brought into conforming association with at least one surface of the substrate and is securely bonded to the substrate to form thereon a smooth and wrinkle-free protective and decorative coating.

A potential problem with dried paint layers that contain reflective metal flakes, is that when stretched during a thermoforming operation, they may exhibit a loss in gloss. Although the applicants do not wish to be bound by theoretical considerations, they believe that a major cause of the loss of gloss in such a coating is a roughening of the coating surface resulting from the lack of plastic flow of the metal flakes, in contrast to the plastic flow of the surrounding polymeric vehicle during thermoforming. This results in surface protuberances, more pronounced when several metal flakes are positioned one beneath the other.

The present invention provides an improvement in a paint composition containing metal flakes and in articles coated with such compositions. The new composition reduces the potential for loss of gloss when films or dried coated layers of the composition are stretched in thermoforming procedures and bonded to a substrate.

BRIEF SUMMARY OF THE INVENTION

The paint composition of the invention is a fluid paint composition for forming a dried paint film useful in a thermoforming process in which the film is stretched and bonded to a three-dimensional substrate to form a decorative coating having a high degree of geometric metamerism. The composition comprises (a) a liquid medium,
(b) a film-forming polymer, and
(c) dispersed in said liquid medium, low-melting reflective flakes of a metal or alloy having a melting point between about 50 degrees C. higher than the thermoforming temperature and about 5 degrees higher than the highest temperature to which the bonded film is subjected in normal use.

The invention also includes flexible and stretchable sheet material having a paint layer which contains low-melting metal flakes and a bonded article which includes a thermoformed film layer containing such low-melting metal flakes.

THE DRAWINGS

The invention will be further described by reference to the drawings, of which:

FIG. 1 is a diagrammatic illustration of cross sections of a stretchable sheet material of the invention having a paint layer that contains low melting metallic flakes, the material being shown before and after stretching; and FIG. 2 is a similar illustration before and after stretching of another sheet material having a paint layer that contains high melting flakes.

DETAILED DESCRIPTION

Figure 1:
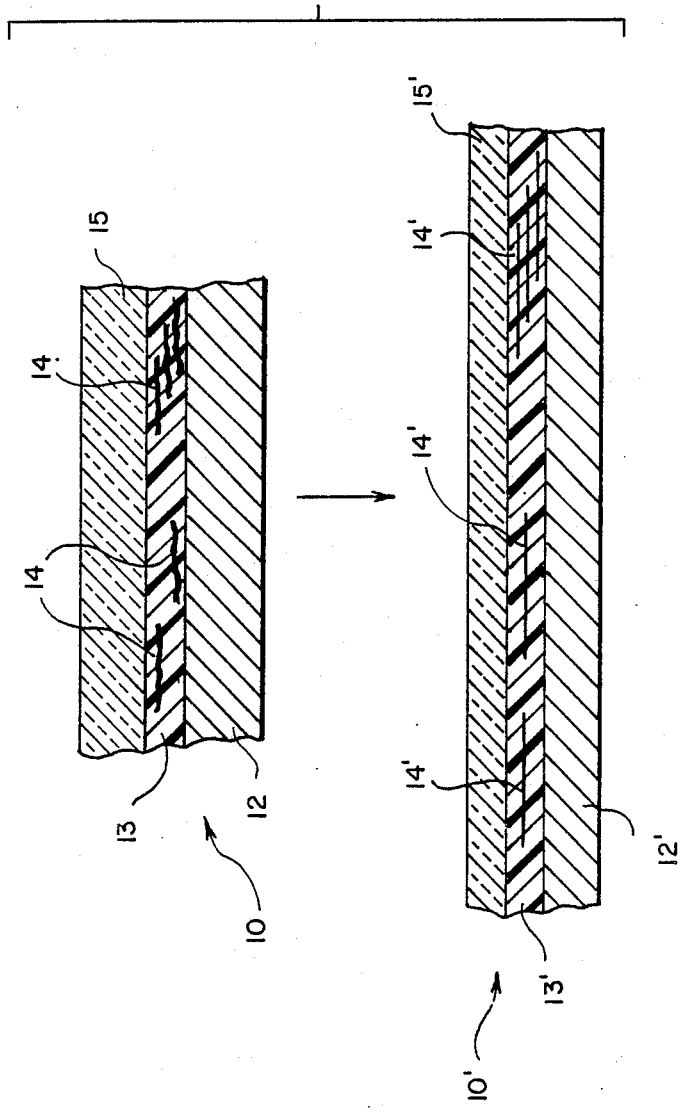

Referring to FIG. 1 the film 10 shown in cross section represents sheet material of the invention before being stretched or thermoformed. It comprises a carrier film 12 on which is coated a paint layer 13. Dispersed in the paint layer are low melting flakes 14 which are positioned approximately parallel to the carrier film. A thin tie coat, not shown in the drawing, can be positioned between film 12 and paint layer 13. Over the paint layer is coated a clearcoat layer 15.

In the lower portion of FIG. 1 is shown the sheet material 10' after being stretched and thermoformed at a temperature of about 100 degrees C. which is higher than the melting point of the low melting metal flakes 14. As shown, the layers 12', 13', 15' are thinner than before stretching but remain substantially parallel. The metal flakes 14' are elongated as a result of stretching with the sheet material at a temperature a few degrees above their melting point.

In FIG. 2 is shown a sheet material 20 similar to the sheet material 10, except that the metallic flakes 24 are of a high melting metal such as aluminum. The lower portion of FIG. 2 depicts the sheet material 20' after being stretched and thermoformed at around 140 degrees C. This shows that the carrier film 21' has been elongated and thinned. The paint layer 22' and clearcoat 25' have developed contours. This is the result of the inherent somewhat non-uniform distribution of the aluminum flakes in the paint layer. Thus in a region where the flake concentration is relatively high, a significant mound 27' occurs. Likewise in other regions where flakes are present the contour is relatively high.

On the other hand, in regions 28' and 29' where there is no flake, the sheet necks down when stretched, forming small depressions. Although applicants do not wish to be bound by this theory, they believe this to be a reasonable explanation for the irregular profile and loss of gloss in the stretched sheet containing high melting flake. Likewise they believe that the low melting flake improves the smoothness of the sheet material as illustrated diagrammatically in FIG. 1.

The sheet material of the invention thus comprises a protective and decorative paint layer suitable for use in a thermoforming process, comprising a film-forming binder and metal flakes, all or part of which flakes consist of a metal or alloy whose melting point is within the range between about 50 degrees C. above the temperature of the paint layer during thermoforming stretching and about 5 degrees C. above the highest temperature to which the protective and decorative coating is normally exposed during subsequent use. The protective and decorative layer material may be prepared by coating the paint layer on a web support, with subsequent application to the substrate in combination with the support, or with subsequent transfer from the support during a thermoforming and stretching operation, or else by conventional methods of application such as brushing or spraying, followed by thermoforming and stretching of the substrate.

The paint composition of the invention comprises a liquid medium, a film-forming binder, metal flakes, and optionally a colorant.

The film-forming binder can comprise any of the film-forming resins conventionally used as binders in paint layer compositions. Particularly useful resinous binders are acrylic polymers, polyesters, including alkyds, and polyurethanes. Examples of such binders and methods for the preparation thereof are described in U.S. Pat. Nos. 4,681,811; 4,403,003 and 4,220,679.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

If the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxyethyl methacrylate. The coating composition in such cases contains a crosslinking agent such as a condensate of an amine or an amide with formaldehyde such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates may be also used. Also, the acrylic polymer can be prepared with N-(alkoxymethyl)acrylamides and N-(alkoxymethyl)methacrylamides which results in self-crosslinking acrylic polymers.

Besides acrylic polymers, the resinous binder for the paint composition may be an alkyd resin or a polyester.

Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylopropane, and pentaerythritol.

Suitable polycarboxylic acids include succinic acid, adipic acid, azelaic acid, sebacic acid, maleic acid, fumaric acid, phthalic acid, tetrahydrophthalic acid, hexhydrophthalic acid, and trimellitic acid. Besides the polycarboxylic acids mentioned above, functional equivalents of the polycarboxylic acids such as anhydrides where they exists or lower alkyl esters of the polycarboxylic acids such as the methyl esters may be used.

If it is desired to produce air-drying alkyd resins, suitable drying oil fatty acids may be used and include those derived from linseed oil, soya bean oil, tall oil, dehydrated castor oil or tung oil.

The polyesters and preferably the alkyd resins contain a portion of free hydroxyl and/or carboxyl groups which are available for further crosslinking reaction. Suitable crosslinking agents are the amine or amide-aldehyde condensates or the polyisocyanate curing agents as mentioned above.

Polyurethanes can also be used as the resinous binder of the paint layer. Among the polyurethanes which can be used are polymeric polyols which are prepared by reacting polyester polyols or acrylic polyols with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1, 2, 4-benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based paint layer compositions. Water-based paint layers in color plus-clear compositions are disclosed in U.S. Pat. No. 4,403,003, and the resinous compositions used in preparing these basecoats can be used in the practice of this invention. Also, water-based polyurethanes such as those prepared in accordance with U.S. Pat. No. 4,147,679 can be used as the resinous binder in the paint layer herein.

The resinous binder for the paint layer can also be the resinous binder used in formulating a clear topcoat layer when present.

The liquid medium of the paint composition can include solvents for the film-forming resin as well as liquid diluents which are not solvents. The solvent system may be organic or aqueous or a combination. In one preferred embodiment of the invention the film-forming polymer is present as a latex, and the medium is a combination of water and organic solvents promoting coalescence such as N-methyl pyrrolidone, as illustrated in the later examples. The medium maybe a single compound or a mixture of compounds. Factors such as solubility, miscibility, polarity, hydrophilicity and lyophilicity may be considered. Illustrative of suitable components of the liquid medium are alcohols such as lower alcohols containing 1 to 8 carbon atom, including methanol, ethanol, propanol, isopropanol, butanol, sec-butyl alcohol, tert-butyl alcohol, amyl alcohol, hexyl alcohol, ethers and ether alcohols such as ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether and dipropylene glycol monobutyl ether, ketones such as methyl ethyl ketone, methyl isobutyl ketone, methyl amyl ketone and methyl n-butyl ketone, esters such as butyl acetate, 2-ethoxyethyl acetate and 2-ethylhexyl acetate, aliphatic and alicyclic hydrocarbons such as petroleum naphthas and cyclohexane, aromatic hydrocarbons such as toluene and xylene, and water. The concentration of liquid medium in the paint composition can vary over a wide range. In general, however, a rather high solids content is desirable, e.g. of the order of 20 to 60 weight percent with the balance being the liquid medium. When the latter is an aqueous medium it can be, for example, 70 to 99 percent water and the rest organic solvent or solvents.

The heat softening and tensile elongation properties of the paint layer must permit substantial elongation by the application of stretching forces without splitting or crazing of the paint layer or delamination of the paint layer from the sheet film support when the latter is present. Area extension of as much as 150% may take place during thermoforming.

The paint composition of this invention contains reflective flakes in addition to the liquid medium, the binder and an optional colorant. At least 5, and preferably at least 25, weight percent of content consists of flakes of a low melting metal or alloy, as mentioned. However, the reflective flake component can also include higher melting flakes such as reflective particles which have conventionally been used in paint layers. These include metallic flakes such as aluminum flake, copper flake, bronze flake, copper bronze flake, nickel flake, zinc flake, magnesium flake, silver flake, gold flake and platinum flake as well as other platelets such as mica, glass, stainless steel, coated mica, coated glass, and aluminum coated polyester film fragments. Mixtures of two or more types of particles can be used.

As previously mentioned, the aesethetic advantages of paint layers containing metal flakes may, when the layer is thermoformed and stretched, be accompanied by a loss of gloss, as determined by e.g. the 20-Degree Gloss measurement (ASTM Test D-523) or Distinctness of Image measurement (ASTM Test E-430). The degree of which loss is dependent on the degree of stretching of the paint layer during thermoforming during or after its application to the substrate. The possible loss of gloss can be avoided or reduced by the paint composition of the invention, in which all, or at least 25 weight percent, of the metal flakes are prepared from a metal or alloy whose melting point is within the range between about 50 degrees C. above the temperature of the paint layer during thermoforming stretching and about 5 degrees C. above the highest temperature to which the protective and decorative coating is normally exposed during subsequent use of the decorated article.

The paint composition optionally comprises a colorant incorporated in the film-forming binder. Conventional colorants used in surface coating compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

In one embodiment, the protective and decorative layer is applied to a planar, self-supporting, stretchable, thermoplastic polymeric film support sheet, as described in the Reafler application cited above. Also as described by Reafler, the paint layer can be coated on the support having thereon an adhesion-promoting tie layer which provides improved bonding strength and thereby reduces the risk of delamination; a transparent topcoat layer can be coated over the paint layer; and a suitable adhesive can be coated on the surface of the film support sheet opposite the paint layer. Vacuum forming and thermoforming techniques are used to apply the sheet material carrying the paint layer to structural substrates, such as exterior automobile panels.

In another embodiment, the metal flake-containing paint composition of the invention can be coated on a temporary carrier sheet and transferred to the substrate during thermoforming application with the aid of an adhesive on the surface of the paint layer opposite the carrier sheet, as described by the Johnson et al EPO patent application cited above. In a third embodiment, the metal flake-containing paint layer can be applied to the substrate by conventional methods such as brushing, dipping, flow coating, compressed air spraying, electrostatic spraying, hot spraying or airless spraying, where the paint layer is subsequently stretched during thermoforming of the substrate.

Besides the polymeric vehicle, metal flakes and optional pigment or colorant, the paint composition can contain addenda such as UV absorbers, fillers, plasticizers, antioxidants etc. known to be useful in polymeric films.

In the first embodiment described above, the sheet material of the invention comprising the metal flake-containing paint layer is applied to a three-dimensional substrate by thermoforming with vacuum. The sheet is softened by heating, e.g. with banks of infra-red lamps or with ceramic heaters to a typical temperature of 115–150 degrees C., and plastically stretched during thermoforming to an extended shape depending on the shape of the substrate. Portions of the sheet material may be extended to an area which is up to 100% or even 150% greater than its relaxed area. The sheet material is thus brought into conforming association with at least one surface of the substrate and is securely bonded to the substrate to form thereon a smooth and wrinkle-free protective and decorative coating. The metal flake-containing layer can be subjected to a similar degree of extension or stretching during thermoforming in its other embodiments such as transferable paint layers or spray-applied layers. Whatever the embodiment, the metal flakes of the paint layer have the characteristic of a sufficient reduction in their yield strength at the thermoforming temperature that a significant deformation of the flakes takes place during thermoforming of the layer.

The paint composition of the invention comprises metal reflective flakes at least part of which, preferably at least 25 weight percent of which, are flakes of a metal or alloy having a melting point in the range between about 50 degrees C. above the temperature of the paint layer during thermoforming stretching and about 5 degrees C. above the highest temperature to which the protective and decorative coating is normally exposed during subsequent use of the decorated article. For example, in exterior automotive finishes thermoformed at about 140 degrees C., alloys melting between about 190 degrees C. and about 90 degrees C. can preferably be used. Examples of some suitable metal alloys useful for flakes for the automotive finish described above are listed below.

| Alloy | | | | Melting Point |
|---|---|---|---|---|
| % Bi | % Pb | % Sn | % Cd | degrees C. |
| 50 | 20 | 30 | 0 | 100 |
| 40 | 40 | 20 | 0 | 111 |
| 33.3 | 33.3 | 33.3 | 0 | 123 |
| 0 | 26.5 | 59.3 | 14.2 | 136 |
| 20 | 40 | 40 | 0 | 145 |
| 11.2 | 44.4 | 44.4 | 0 | 160 |
| 12.5 | 50 | 37.5 | 0 | 178 |
| 0 | 31 | 69 | 0 | 187 |
| 0 | 20 | 80 | 0 | 200 |

The metal flakes can be prepared by ball milling of metal powders as described by Tundermann et al., U.S. Pat. No. 3,941,584. Flake thickness is preferably less than 1 micrometer, and the average dimension across a major flake axis is preferably about 5–80 micrometers. Flake content of the paint layer formulation can be from 0.5% to 60% by weight of the total solids, preferably from 10% to 50%. Of this flake amount, the low melting flakes can comprise 5–100% of the total, preferably 25–100%.

COMPARISON EXAMPLES

Loss of Gloss in a Thermoformed Sheet Material

These examples illustrate a loss of gloss in stretched portions of a thermoformed protective and decorative sheet material whose paint layer contains aluminum flakes, as compared to lower loss observed when the metallic flakes are absent.

(a) Flake-containing Sheet Material

The thermoformable sheet material comprised a carrier film, a tie layer, a paint layer and a crosslinked clear topcoat layer formed by premixing two reactive components. The surface of the carrier film opposite the paint layer was coated with a pressure sensitive adhesive.

The adhesive was an acrylic resin composition supplied by PPG Industries Inc. as Shrink Wrap Adhesive HC7803. The other coating compositions were as follows:

TABLE I

| Metallic Paint Composition | Approx. Wt. % |
|---|---|
| Deionized water | 50 |
| Urethane resin | 25 |
| Aluminum flake paste* | 5 |

TABLE I-continued

| Metallic Paint Composition | Approx. Wt. % |
|---|---|
| Ethylene Glycol Monohexyl Ether | 5 |
| N-Methylpyrrolidone | |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

*Aluminum Content Approx. 65 wt. %.

TABLE II

| Topcoat Composition | Approx. Wt. % |
|---|---|
| Component A: | |
| Urethane Resin | 60 |
| Toluene | 30 |
| 2-Butoxy Ethyl Acetate | 10 |
| Benzotriazole | 1 |
| *Component B: | |
| Polyfunctional aliphatic isocyanurate resin based on 1,6-hexamethylene diisocyanate | 100 |

*Available as Desmodur N-3000 from Mobay Corporation Coatings Division.

TABLE III

| Tiecoat Composition | Approx. Wt. % |
|---|---|
| Deionized water | 75 |
| Acrylic resin | 10 |
| Urethane resin | 10 |
| N-Methylpyrrolidone | 1 |
| Diethylene Glycol Monobutyl Ether | 1 |
| Ethylene Glycol Monohexyl Ether | <1 |
| N,N-Dimethyl Ethanolamine | <1 |
| FC 170 Surfactant, sold by 3M Co. | 0.05 |

The coatings were applied by means of an extrusion hopper and dried after each coating. Dried thicknesses of the layers were as follows:

| Layer | Approx. Thickness, micrometers |
|---|---|
| Adhesive | 76 |
| Support | 191 |
| Tie | 0.5 |
| Paint | 38 |
| Top-Coat | 76 |

The dried paint layer contained aluminum flakes of about 0.2–2 micrometer average thickness and average length about 2–20 micrometers, at a level of about 22% of the total dry weight of the paint layer.

Samples of the sheet material were applied by a vacuum thermoforming process to inclined metal test plates, thus providing a regular increase in thermoforming stretching along the length of the incline. The sheet material was heated by banks of infra-red lamps to about 135 degrees C., as measured with a surface pyrometer, then moved to an opening in the chamber containing the inclined test panel and applied by vacuum drawdown.

(b) Comparison Example Without Flake

Sheet material was prepared as in Comparison Example (a), but the paint layer was coated from the following formulation to a similar dry thickness. The aluminum flake was replaced with a relatively small amount of carbon black pigment.

TABLE IV

| Non-Metallic Paint Composition | Approx. % Wt. |
|---|---|
| Urethane Resin | 65 |
| Deionized after | 20 |
| Ethylene Glycol Monohexyl Ether | 5 |
| Diethylene Glycol Monobutyl Ether | 5 |
| Carbon Black | 1 |
| N,N-Dimethyl ethanolamine | 4 |
| N-Methylpyrrolidone | 4 |

Gloss of the decorated test panel surface was measured by the ASTM D-523 method, using a Hunter 20 Degree ASTM Glossmeter. Distinctness of Image (DOI), another standard gloss criterion, was measured by the ASTM E-430 method, using a Hunterlab Model D47R-6 Dorigon Glossmeter.

TABLE V

| Effect of Stretch on Gloss | | | | |
|---|---|---|---|---|
| Approx. Stretch | 20 Degree Gloss | | DOI | |
| Area % | Ex. (a) | Ex. (b) | Ex. (a) | Ex. (b) |
| 0–10 | 64 | 74 | | |
| 10–20 | 72 | 84 | | |
| 20–30 | 64 | 82 | 11.8 | 85.0 |
| 30–40 | 53 | 84 | | |
| 40–50 | 42 | 82 | | |
| 50–70 | 34 | 80 | 4.3 | 64.2 |
| 60–80 | 29 | 77 | | |
| 80–100 | 22 | 73 | | |
| 100–150 | 14 | 62 | | |
| 200 | 13 | 60 | | |

The results tabulated in Table V show that the 20 Degree Gloss of the metal flake-containing coating (a) was reduced as the degree of stretch increased, falling to about 20% of its initial level as the area of stretch reached about 200%.

By contrast, coating (b) which contained no metal flake beginning at a higher gloss level, showed no significant loss with degrees of stretching up to about 100%, and much smaller losses at higher degrees of stretching than observed for the flake-containing coating. DOI of the flake-containing coating (a), which began at a much lower level than in the comparison coating (b), also suffered a greater percentage loss on stretching than did the DOI of the comparison coating.

INVENTION EXAMPLE

A paint composition of the invention can be prepared with the same composition as in Table I except that the aluminum flake is replaced by flakes, for example, of an alloy of equal parts of bismuth, lead and tin having a melting point of about 123 degrees C. and of the same particle size and concentration as in Comparison Example (a). This composition is coated in a uniform layer on a thermoformable carrier film by means of an extrusion coating hopper of the type disclosed in the patent to Beguin, U.S. Pat. No. 2,681,294 and dried to a thickness of about 38 micrometers to obtain a sheet material with excellent gloss and distinctness of image. When vacuum thermoformed on metal test panels at about 150 degrees C., the loss of gloss and of DOI will be substantially less than in the Comparison Example (a).

The invention has been described in detail with particular reference to preferred embodiments thereof, but it will be understood that variations and modifications can be effected within the spirit and scope of the invention.

What is claimed is:

1. A fluid paint composition for forming a dried paint film useful in a thermoforming process in which the film is stretched and bonded to a three-dimensional substrate to form a decorative coating having a high degree of geometric metamerism, said composition comprising
   (a) a liquid medium,
   (b) a film-forming polymer, and
   (c) dispersed in said liquid medium,
   low-melting reflective flakes of an alloy having a melting point between about 50 degrees C. higher than the thermoforming temperature and about 5 degrees C. higher than the highest temperature to which the bonded film is subjected in normal use and wherein the melting point of the alloy is from about 95 to 200 degrees C.

2. The composition of claim 1 wherein said alloy is derived from at least two metals selected from the group consisting of Bi, Pb, Sn and Cd.

3. The composition of claim 1 wherein said alloy has a composition by weight percent selected from Bi(50) Pb(20) Sn(30); Bi(40) Pb(40) Sn(20); Bi(33.3) Pb(33.3) Sn(33.3); Pb(26.5) Sn(59.3) Cd(14.2); Bi(20) Pb(40) Sn(40); Bi(11.2) Pb(44.4) Sn(44.4); Bi(12.5) Pb(50) Sn(37.5); Pb(31) Sn(69) and Pb(20) Sn(80).

4. A composition of claim 1 wherein the average thickness of the flakes is less than about 1 micrometer and the average dimension across a major flake axis is from about 5 to 80 micrometer.

5. A composition of claim 4 wherein the flake content is from about 0.2 to 25 weight percent.

6. A composition of claim 5 which also contains higher melting flakes having a melting point above 200 degrees C., the low-melting flakes comprising at least about 25 weight percent of the total flake content.

7. A flexible and stretchable sheet material adapted for use in a thermoforming process in which it is stretched and bonded to a three-dimensional substrate to form thereon a decorative coating exhibiting a high degree of geometric metamerism, said sheet material comprising:
   (1) a thin, essentially planar, stretchable, thermoplastic polymeric carrier film of substantially uniform thickness; said carrier film having heat-softening and tensile elongation properties which adapt it to use in said thermoforming process; and
   (2) a thin paint layer of substantially uniform thickness on one surface of said thermoplastic polymeric carrier film, said paint layer comprising colorant and reflective flakes incorporated in a film-forming binder; having heat-softening and tensile elongation properties that are compatible with those of said carrier film so as to permit elongation, whereby said sheet material can undergo substantial elongation by the application of stretching forces without crazing or delamination of said paint layer; and said reflective flakes being formed of an alloy having a melting point between about 50 degrees C. higher than the thermoforming temperature and about 5 degrees C. higher than the highest temperature to which the sheet material bonded to the substrate is subjected in normal use and wherein the melting point of the alloy is from about 95 to 200 degrees C.

8. A sheet material of claim 7 wherein the average thickness of the flakes is less than about 1 micrometer and the average dimension across a major flake axis is from about 5 to 80 micrometer.

9. A sheet material of claim 8 wherein the flake content is from about 0.2 to 25 weight percent.

10. A sheet material of claim 9 which also contains higher melting flakes having a melting point above 200 degrees C., the low melting flakes comprising at least 25 weight percent of the total flake content.

11. A bonded article comprising a thermoformed and stretched protective and decorative film layer bonded to a substrate, said layer comprising a stretchable thermoplastic polymer having dispersed therein low-melting reflective flakes formed of an alloy having a melting point between about 50 degrees C. higher than the temperature at which the film is thermoformed and about 5 degrees C. higher than the highest temperature to which the bonded film and substrate will be subjected in normal use and wherein the melting point of the alloy is from about 95 to 200 degrees C.

12. An article of claim 11 wherein the average thickness of the flakes is less than about 1 micrometer and the average dimension across a major flake axis is from about 5 to 80 micrometer.

13. An article of claim 12 wherein the flake content is from about 0.2 to 25 weight percent.

14. An article of claim 13 which also contains higher melting flakes having a melting point above 200 degrees C., the low melting flakes comprising at least 25 weight percent of the total flake content.

* * * * *